(12) United States Patent
Mercat et al.

(10) Patent No.: US 7,252,344 B2
(45) Date of Patent: Aug. 7, 2007

(54) MULTI-PIECE COMPOSITE HUB ASSEMBLY FOR A BICYCLE

(75) Inventors: Jean-Pierre Mercat, Chavanod (FR); Guillaume Martin, Annecy (FR)

(73) Assignee: Salomon S.A., Metz-Tessy (FR)

( * ) Notice: Subject to any disclaimer, the term of this patent is extended or adjusted under 35 U.S.C. 154(b) by 112 days.

(21) Appl. No.: 10/849,859

(22) Filed: May 21, 2004

(65) Prior Publication Data

US 2004/0251736 A1   Dec. 16, 2004

(30) Foreign Application Priority Data

May 23, 2003   (FR) ................................. 03 06221

(51) Int. Cl.
*B60B 35/00* (2006.01)
(52) U.S. Cl. .................. 301/124.2; 301/110.5
(58) Field of Classification Search .................. 301/59,
301/110.5, 110.6, 124.2, 124.1; 29/894.36,
29/894.361; 280/279, 286
See application file for complete search history.

(56) References Cited

U.S. PATENT DOCUMENTS

| | | | | |
|---|---|---|---|---|
| 2,997,145 A | * | 8/1961 | Ross ........................ | 192/217.7 |
| 3,131,008 A | * | 4/1964 | Dian ........................ | 301/110.5 |
| 3,922,018 A | * | 11/1975 | Shook ...................... | 301/110.5 |
| 3,967,856 A | * | 7/1976 | Beauchet ................. | 301/110.5 |
| 4,424,981 A | * | 1/1984 | Maxwell, III ............ | 301/110.5 |
| 4,763,957 A | * | 8/1988 | Poehlmann et al. ..... | 301/110.5 |
| 5,531,510 A | | 7/1996 | Yamane .................... | 301/110.5 |
| 5,632,364 A | | 5/1997 | Mercat ..................... | 192/64 |
| 5,647,643 A | * | 7/1997 | Noble ...................... | 301/110.5 |
| 6,018,869 A | * | 2/2000 | Slankard et al. ........ | 29/894.361 |
| 6,030,052 A | * | 2/2000 | Watarai et al. ........... | 301/110.5 |
| 6,189,978 B1 | | 2/2001 | Lacombe et al. ........... | 301/104 |
| 6,296,322 B1 | | 10/2001 | Marzocchi et al. ...... | 301/124.2 |
| 6,299,258 B1 | * | 10/2001 | Wright et al. ............. | 301/124.1 |
| 6,375,273 B2 | * | 4/2002 | Pont ........................... | 301/59 |
| 6,402,256 B1 | | 6/2002 | Mercat .................... | 301/95.104 |
| 6,454,363 B1 | * | 9/2002 | Vignocchi et al. ....... | 301/124.2 |

(Continued)

FOREIGN PATENT DOCUMENTS

EP            0890505           1/1999

(Continued)

OTHER PUBLICATIONS

UltraHard Materials Limited, "Comprising UHM's CeTZP with Various Steels", Jun. 29, 2006, pp. 1-4.*

(Continued)

*Primary Examiner*—Jason R. Bellinger
(74) *Attorney, Agent, or Firm*—Greenblum & Bernstein, P.L.C.

(57) ABSTRACT

A hub for a bicycle wheel having a hub body rotationally mounted on a central hollow shaft by means of bearings mounted on the shaft, the hollow shaft adapted to receive a quick release axle which projects beyond both ends of the axle. The shaft has three distinct portions, two end pieces and a central portion made of a material having a lower density than the end pieces, the end pieces being fitted to each end of the central portion, the end pieces having bearing surfaces for the bearings, and at least one of the end pieces having a threaded portion, respectively, for a nut for axially tightening the bearings.

19 Claims, 4 Drawing Sheets

U.S. PATENT DOCUMENTS

| | | | |
|---|---|---|---|
| 6,568,767 B2 * | 5/2003 | Meggiolan | 301/110.5 |
| 6,688,704 B2 | 2/2004 | Meggiolan | 301/110.5 |
| 2002/0108249 A1 | 8/2002 | Meggiolan | 29/895.3 |

FOREIGN PATENT DOCUMENTS

| | | |
|---|---|---|
| EP | 1000847 | 5/2000 |
| EP | 1084868 | 3/2001 |
| EP | 1110754 | 6/2001 |
| EP | 1231047 | 8/2002 |
| EP | 1231077 | 8/2002 |
| FR | 2724431 | 3/1996 |
| FR | 2739059 | 3/1997 |
| FR | 2767285 | 2/1999 |
| FR | 2771677 | 6/1999 |
| FR | 2832672 | 5/2003 |

OTHER PUBLICATIONS

UltraHard Materials Limited, "Comprising UHM's CeTZP with Metals", Jun. 29, 2006, pp. 1-4.*

* cited by examiner

MULTI-PIECE COMPOSITE HUB ASSEMBLY FOR A BICYCLE

CROSS-REFERENCE TO RELATED APPLICATION

This application is based upon French Patent Application No. 03.06221, filed May 23, 2003, the disclosure of which is hereby incorporated by reference thereto in its entirety and the priority of which is hereby claimed under 35 U.S.C. §119.

BACKGROUND OF THE INVENTION

1. Field of the Invention

The invention relates to the central hub of a bicycle wheel. It also relates to a bicycle wheel equipped with such a hub.

2. Description of Background and Relevant Information

In a conventional construction, a bicycle wheel has a central hub through which the wheel and the bicycle frame.

Recently, efforts have been made to reduce the weight of the wheel for improving the inertial behavior of the wheel.

In this regard, patent document EP 1 084 868 and U.S. Pat. No. 6,402,256 teach that one can decrease the thickness of the lower bridge of the rim between two consecutive zones for fastening the spokes in order to decrease the weight of the rim without substantially affecting the rigidity and the strength of the wheel.

Likewise, patent documents EP 1 231 047 and U.S. Pat. No. 6,688,704 describe a method of making a rim from a carbon fiber material, and EP 1 231 077 and U.S. Published Application Publication No. 2002/0108249 describe a method of making a hub body from a carbon fiber material.

Indeed, a composite structure made of carbon fiber is lighter than a metallic structure, because carbon has a density that is less than that of aluminum, for example, and a higher modulus of compression. However, one cannot perform machinings, such as a threading or tapping, with a carbon element.

The patent document EP 1 110 754 and U.S. Pat. No. 6,375,273 describe a hub having three elements, two lateral flanges and a central portion. These three elements can be made from various materials. In particular, one can infer therefrom that the central portion can be made from a material that is lighter than the lateral flanges in order to reduce weight.

SUMMARY OF THE INVENTION

An object of the invention is to propose a hub whose weight is further decreased with respect to existing hubs.

To this end, the hub according to the invention has a hub body rotationally mounted on a central hollow shaft by means of bearings mounted on the shaft and housed in the hub body, the shaft having at each of its ends a shouldered nipple provided to be engaged in the ends to be retained by a bicycle fork, the hollow shaft adapted to receive a quick release axle which projects beyond both ends of the axle.

The shaft has three distinct portions, two end pieces and a central portion, the central portion being made from a material having a lower density than that of the end pieces, the end pieces being fitted to respective ends of the central portion, the end pieces having bearing surfaces for the bearings.

The wheel according to the invention is equipped with such a hub.

BRIEF DESCRIPTION OF DRAWINGS

The invention will be better understood with reference to the following description and attached drawings, which describe and show non-limiting exemplary embodiments according to the invention, in which.

DETAILED DESCRIPTION OF THE INVENTION

Figure 1:
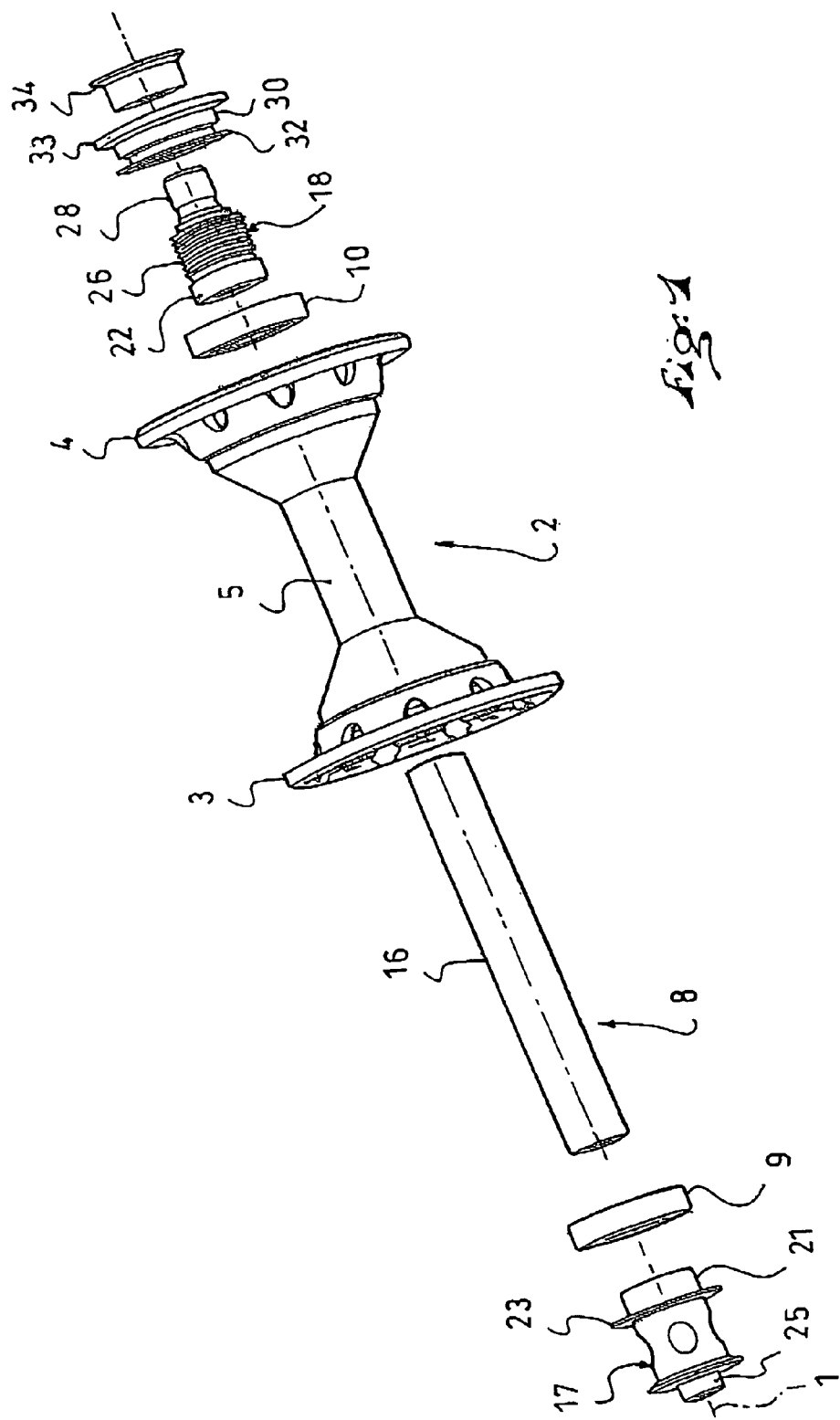
FIG. 1 is an exploded view of the various elements of the hub according to a non-limiting embodiment of the invention.
Figure 2:
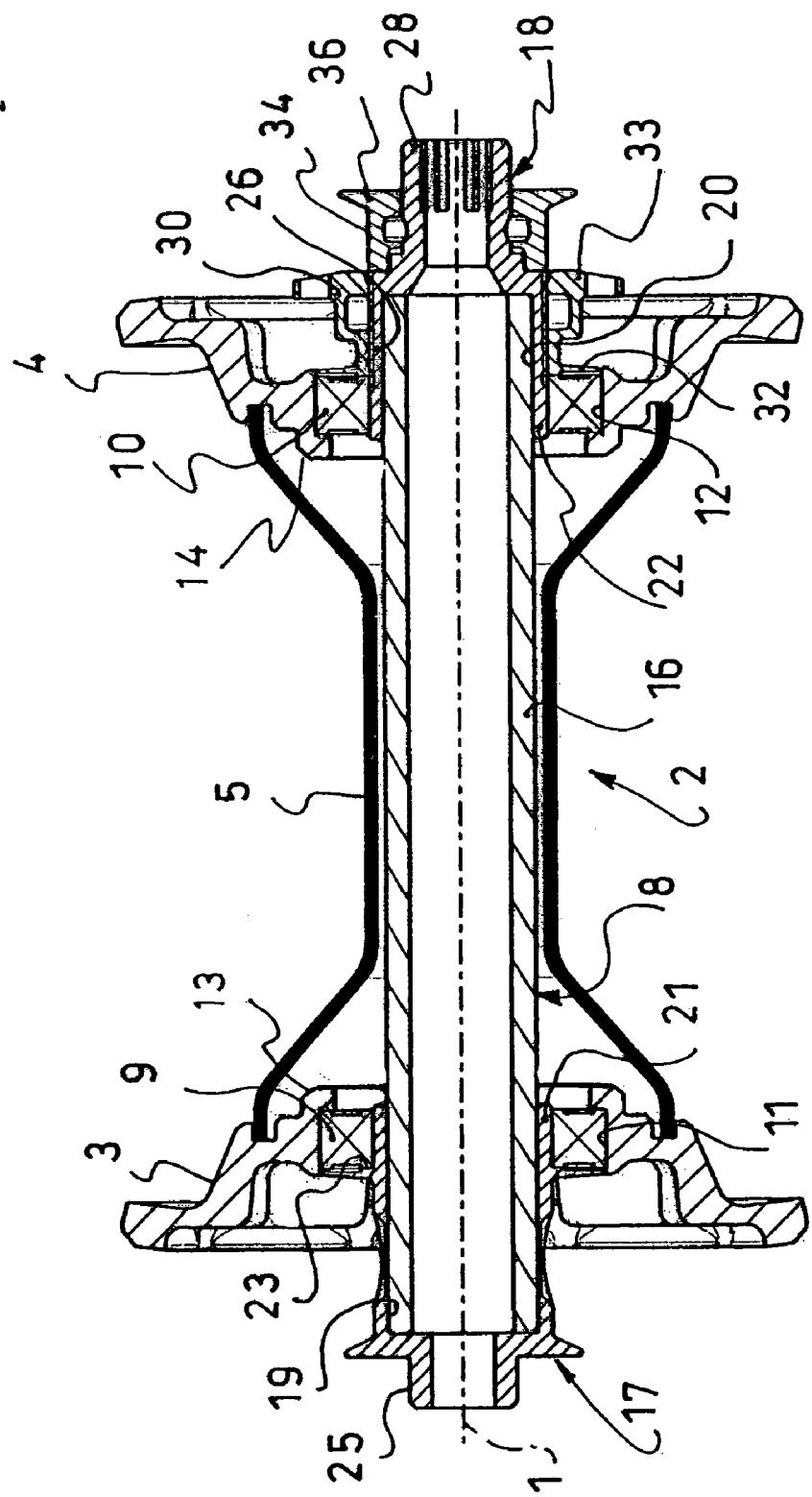
FIG. 2 shows the hub of FIG. 1 in cross section through a longitudinal plane.

FIGS. 1 and 2 show a hub for a front wheel having a hub body 2. The hub body is a hollow element extending along a longitudinal axis represented by line 1.

According to the embodiment shown, the hub body 2 is made of three portions, two lateral flanges 3 and 4 provided for fastening the two sets of spokes and a central portion, or spacer element, 5. The two flanges 3 and 4 have housings for fastening spokes consistent with what is described in the patent document EP 1 110 754 and U.S. Pat. No. 6,375,273. The spacer element 5, having opposed flared ends, has the form of a diabolo.

Advantageously, the three elements are made of various materials. In particular, the two flanges 3 and 4 can be made of an aluminum alloy, such as a 6082 alloy, for example, and the spacer element 5 can be made of a carbon or aramid fiber based composite material. The three elements are assembled by any appropriate means, for example, by fitting the cooperating zones and by means of glue, adhesive, or other assembly method.

The construction of the hub body is not intended to be limiting to the invention. In particular, enlargements could replace the flanges, as described for example in the patent document FR 2 739 059, or even enlargements or bosses with notches as described in the patent document FR 2 767 285 and U.S. Pat. No. 6,189,978, in the FIG. 4 embodiment.

The hub body 2 is mounted on a shaft 8 by means of two bearings 9 and 10 that are located toward each of its ends.

According to the embodiment shown, the bearings are of the ball bearing type having two annular races. The outer bearing races are fitted in respective housings 11, 12, provided in the flanges. They are maintained in the housings by shoulders 13, 14, respectively.

According to a characteristic of the invention, the shaft that bears the bearings and the hub body is made of several portions.

Generally, it has a central portion 16 and two end pieces 17 and 18.

The bearings 9 and 10 are mounted on cylindrical bearing surfaces 21 and 22 of the end pieces 17 and 18. The two bearing surfaces 21 and 22 are machined to the diameter of the inner bearing races of the bearings 9 and 10 for a clearance-free mount. The two end pieces are connected to the central portion 16, the central portion acting as a spacer.

They are made of metal, for example, an alloy of aluminum, magnesium, or titanium. The central portion 16 is made of a material having a density that is lower than that of the end pieces 17, 18 and, for example, a compression modulus that is higher than that of the end pieces.

Advantageously, the central portion 16 is made of carbon fibers embedded in a resin matrix, for example, a thermosetting resin, a polyester resin, or an epoxy resin. With this type of material, one can reach a density of 1.55, that of aluminum being 2.7, and a compression modulus on the order of 110 GPa (Giga pascal), that of aluminum being on the order of 70 GPa. One can reach a strength to compression that is higher than 1800 Mpa (Mega pascal), whereas this compression strength is on the order of 300 to 600 MPa for aluminum.

Under these circumstances, it is to be understood that the central portion 16 is lighter than an element made of aluminum, and that it is particularly adapted for resisting compression induced by the axle for releasing the wheel. This compression can reach a force of 10,000 Newtons. However, a disadvantage of his type of material in comparison with metal alloys is its low resistance to shearing (5 to 10 times lower than standard aluminum). That is why the bearings are mounted on the two metal end pieces 17 and 18 that have a better resistance to shearing.

According to the embodiment shown, the central portion 16 is a cylindrical tube, with an external diameter of 9 mm and a wall thickness of 1.5 mm.

In order to construct the central portion 16, one starts with a carbon fiber tube made by a pultrusion technique which allows excellent mechanical properties to be obtained at a reasonable cost. According to a particular embodiment, the ratio of carbon fibers is equal to or greater than 65%.

The tube is straightened in its diameter over its entire length, then it is cut to the length of the portion 16 and chamfered at its ends.

The end pieces 17 and 18 are provided to be fitted to the ends of the portion 16.

To this end, they each have a shouldered housing 19, 20 whose diameter is equal to the outer diameter of the portion 16. The assembly of the portion 16 and the end pieces 17 and 18 after fitting is obtained by any appropriate means, particularly with glue/adhesive or other assembly method. Nonetheless, it is preferred to use the solution that respects tolerances of narrow and specific diameters for the portion 16 and the housings in order to obtain a forced fitting of the end pieces on the ends of the portion 16.

In order to demarcate the bearing surface 21, the end piece 17 is machined with a radial collar 23 provided to take support on the inner bearing race that is extended by a recessed lip so as to protect the bearing.

At its end, the end piece 17 has a shouldered nipple 25 that is provided to engage in the end for fastening to a fork. The nipple 25 has an opening provided along the axis 1 so as to allow for the passage of the axle for releasing the wheel.

The other end piece 18 has a threaded portion 26 adjacent to the bearing surface 22, then a nipple 28 adapted to the other end for fastening to the fork. The nipple 28 also has an opening for the passage of the quick-release axle. It preferably has an indent, for instance, a hexagonal indent, for engagement with a tool allowing the immobilization of the rotational shaft.

At the top of the threading, the threaded portion has a diameter that is slightly smaller than the diameter of the bearing surface so as to allow for the passage of the bearing 9 when assembling the hub.

A nut 30 is provided to be screwed onto the threaded portion 26. The nut has a collar 32 provided to be supported against the inner bearing race and is extended by a lip for covering the bearing. Under these circumstances, the nut 30, by threaded engagement, allows for the adjustment of the axial stress exerted on the bearings. Preferably, the nut 30 is blocked by any appropriate means so as to avoid an accidental loosening.

In the case of a forced fitting of the end pieces, the tolerances are determined such that the shaft can absorb the reaction to this axial stress without an end piece sliding.

On the outside, the nut has a disk 33 with an indent for fastening a tightening tool, for instance, a series of holes distributed about the axle.

Lastly, the shaft has a ring 34 that is engaged at the end of the end piece 18 and which is supported against a shoulder of the shaft located at the base of the threaded portion 26. The nipple 28 projects with respect to this ring that provides a support surface 36 for the other end for fastening to the fork.

Figure 3:
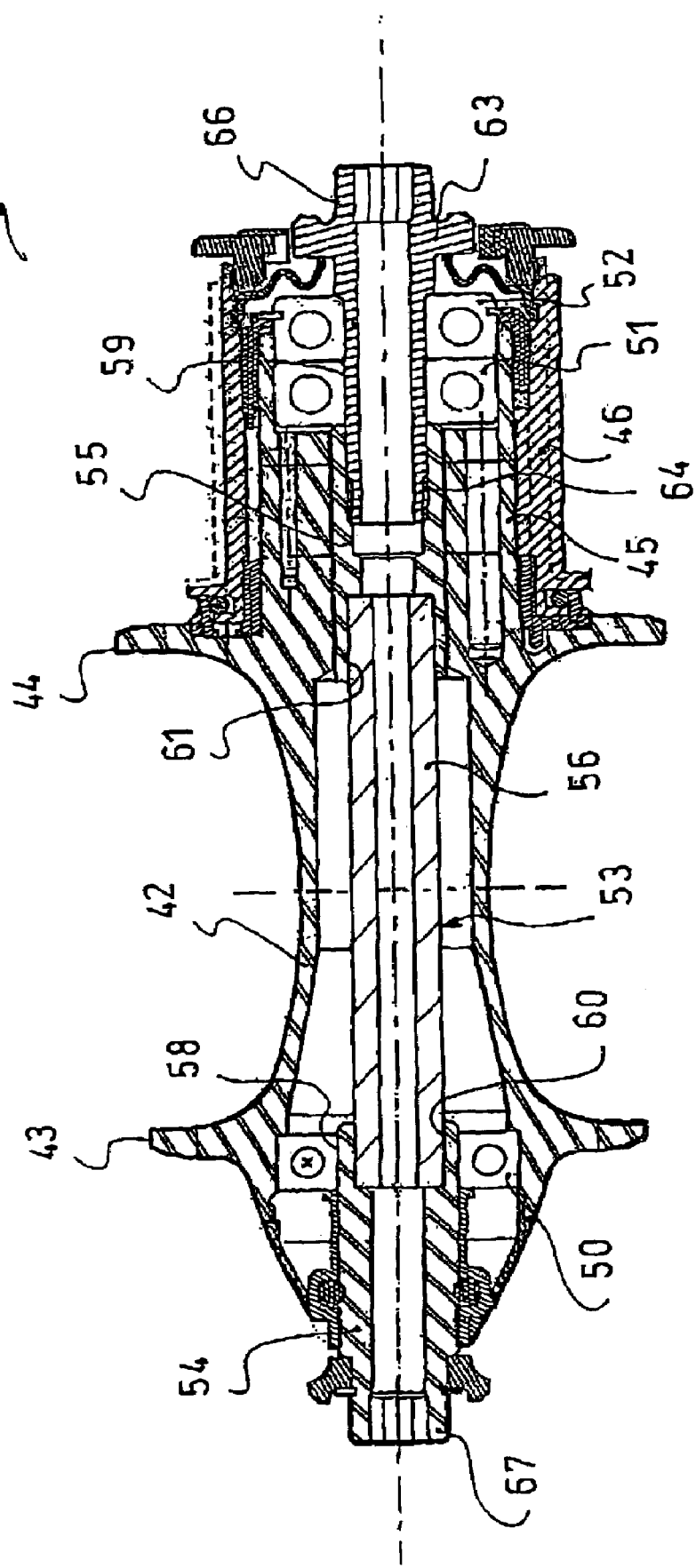
FIG. 3 shows, in cross section, a rear hub implementing the invention.

FIG. 3 shows a rear hub in cross-section. The geometry of this hub is essentially known from the patent document FR 2 724 431 and U.S. Pat. No. 5,632,364, and has not been described in detail. The disclosure of U.S. Pat. No. 5,632,364 is hereby incorporated by reference by reference in its entirety particularly for this purpose.

Generally, the hub has a hub body 42 with two flanges 43 and 44 for fastening the spokes. On one side, the hub body is extended by a hollow shaft 45 on which freewheel body 46 is rotationally mounted, with an intermediate freewheel mechanism. The freewheel body is provided to receive the gears.

The assembly is supported by a central shaft by means of annular ring bearings 50, 51, and 52.

The bearings are supported by a central shaft 53. The shaft is hollow so as to allow for the passage of the axle for releasing the wheel.

According to the present invention, the shaft 53 is made of three portions, two end pieces 54, 55 and a central portion 56.

As in the previous case, the end pieces are made of a metal alloy, such as aluminum or titanium, for example, so as to allow for machinings, such as shoulders, threadings, or tappings. The central portion is made from a material having a lower density and preferably a higher resistance to compression, particularly from a composite material with a fiberglass or carbon fiber base.

The end pieces 54 and 55 each have a bearing surface 58, 59 for the bearings 50, 51, and 52, Furthermore, they have a shouldered housing 60, 61 with a diameter equal to the outer diameter of the central portion 56

The ends of the shaft 56 are fitted by force or by glue or adhesive in these shouldered housings.

The axial stress on the bearings here is ensured by a shouldered screw 63 that is screwed in a threaded hole 64 of the end piece 55. As seen in the figure, the screw 63 projects and its head forms the nipple 66 provided for engagement in the end for fastening to the fork. The other nipple 67 is made integral or unitary with the end piece 54.

Figure 4:
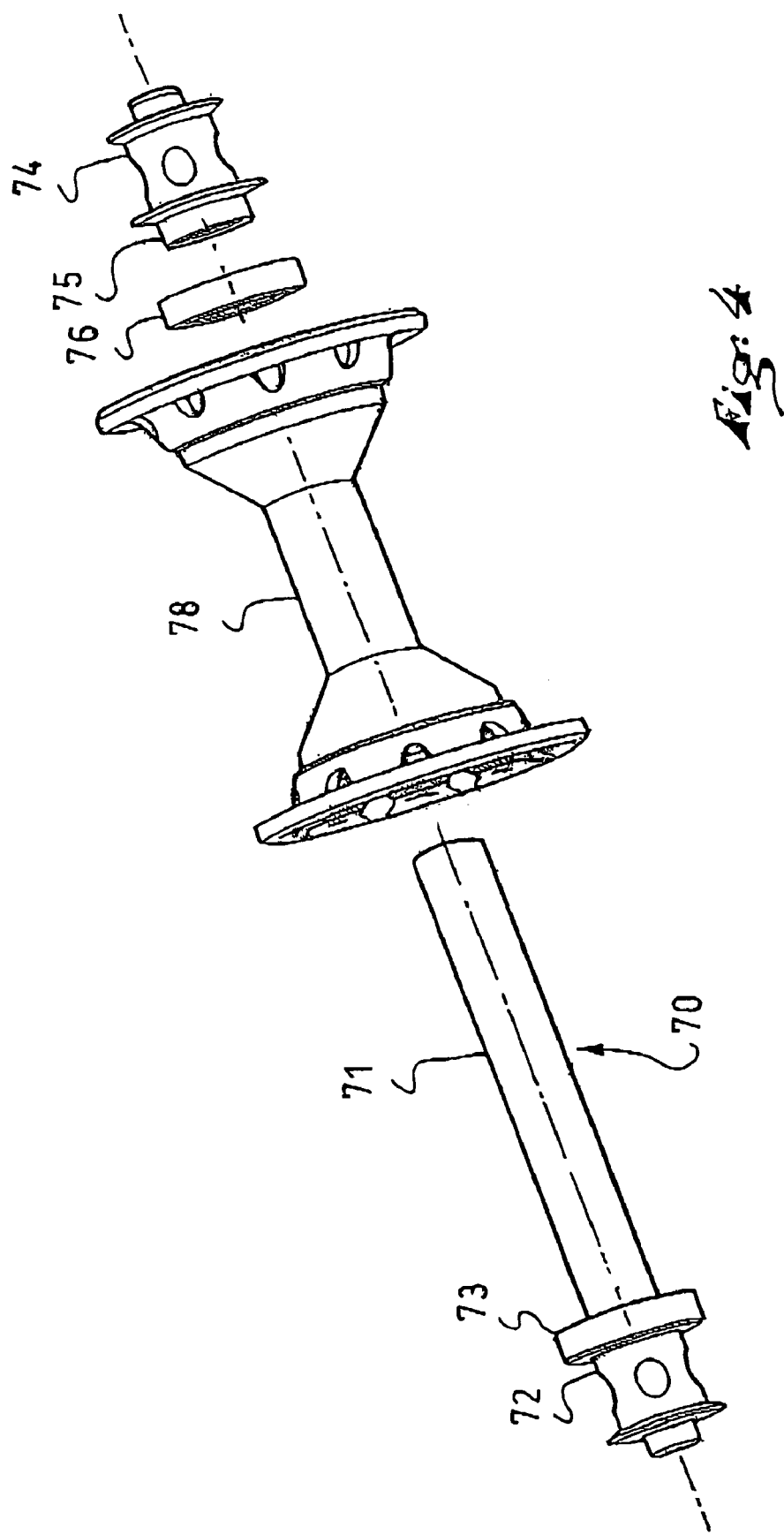
FIG. 4 relates to an alternative embodiment.

According to the alternative shown in FIG. 4, the hub has a hub body 78 mounted to rotate freely on a shaft 70 by means of two bearings 73 and 76.

The shaft 70 has a central portion 71 and two end pieces 72 and 74.

As in the previous cases, the end pieces are metallic, and the central portion is made from a material having a density that is lower than that of the end pieces, particularly from carbon or glass fibers impregnated with resin.

One of the end pieces, the end piece 72 in FIG. 4, is force-fitted to one of the ends of the central portion. This end piece has a machined bearing surface on which the inner bearing race 73 is engaged.

As an alternative, the end piece 72 could be fitted by a sliding contact and possibly be immobilized with glue or adhesive.

The other end piece 74 has a shouldered housing for the end of the central portion which is machined to size, allowing for a sliding contact between the end piece and the central portion, i.e., the end piece can be engaged and disengaged with a force of small amplitude.

The end piece 74 has a bearing surface 75 for the other bearing 76.

Other than the shouldered housings that have a slightly different diameter for the sliding mount of the end piece 74, the two end pieces 72 and 74 are identical.

In the case of the alternative in which two end pieces would be mounted in sliding contact, they would be completely identical.

Upon mounting, the bearings are housed in the hub body, and it is the length of the tube 71 that determines the spacing of the end pieces 72 and 74 and the stress that they exert on the bearings, under the force of compression exerted by the quick-release axle.

Accordingly, there is no threaded zone on one of the end pieces, in contrast with the previous case. The end pieces press on the bearings through their respective radial collar, similar to the previously described collar 23.

The length of the portion 71 is determined depending on the pre-stress desired on the bearings under the tightening stress exerted by the quick-release axle.

As an alternative, one could use measuring washers for precisely determining the spacing of the two end pieces.

The bicycle wheel according to the invention conventionally has a rim, spokes distributed in two sets, and a central hub, according to what has been previously described.

the present invention is given only by way of an example, and one could use other ways for implementing the invention without leaving the scope thereof.

In particular, one could use cup bearings instead of annular bearings.

What is claimed is:

1. A hub assembly for a bicycle wheel, the hub assembly comprising:
    a hollow shaft adapted to receive a quick-release axle and extending along a longitudinal axis, said hollow shaft comprising the following three distinct portions:
        a central portion having a first end and a second end;
        a first end piece mounted to the first end of the central portion of the hollow shaft and extending longitudinally beyond the first end of the central portion of the hollow shaft;
        a first shouldered nipple extending longitudinally from the first end piece of the hollow shaft and adapted to be secured to a first part of a bicycle fork;
        a second end piece mounted to the second end of the central portion of the hollow shaft and extending longitudinally beyond the second end of the central portion of the hollow shaft;
        a second shouldered nipple extending longitudinally from the second end of the hollow shaft and adapted to be secured to a second part of a bicycle fork;
    said central portion forming a spacer between said first and second end pieces;
    said central portion being made of a material having a lower density than a material of either of the first and second end pieces;
    a hub body;
    a first bearing and a second bearing, each of said first and second bearings comprising an inner race and an outer race, said inner races of said first and second bearings being mounted on said first and second end pieces of said central portion of said hollow shaft, and said outer races of said first and second bearings being mounted to the hub body for rotationally mounting the hub body to the hollow shaft.

2. A hub assembly according to claim 1, wherein:
the central portion of the hollow shaft is made of a material having a greater resistance to compression than that of either of the first and second end pieces.

3. A hub assembly according to claim 1, wherein:
the central portion of the hollow shaft is made of carbon or glass fibers embedded in a resin matrix.

4. A hub assembly according to claim 1, wherein:
the first and second end pieces have respective shouldered housings in which the first and second ends of the central portion of the hollow shaft are engaged.

5. A hub assembly according to claim 4, wherein:
the first and second end pieces are force-fitted to the first and second ends of the central portion of the hollow shaft.

6. A hub assembly according to claim 5, wherein:
the first and second end pieces are fitted to the first and second ends of the central portion of the hollow shaft and assembled by glue.

7. A hub assembly according to claim 1, wherein:
at least one of the first and second end pieces has a threaded portion for a nut or a screw for axially tightening the first and second bearings.

8. A hub assembly according to claim 1, wherein:
one of the first and second end pieces is force-mounted to one end of the central portion of the hollow shaft, the other of the first and second end pieces being slidingly mounted.

9. A hub assembly according to claim 1, wherein:
the hub body has two lateral flanges, the central portion of the hollow shaft having a density that is lower than the density of either of the flanges.

10. A bicycle wheel comprising:
a rim;
a hub assembly according to claim 1; and
spokes connecting the hub assembly to the rim.

11. A hub assembly for a bicycle wheel, the hub assembly comprising:
    a central hollow shaft comprising a cylindrical tube extending longitudinally along a longitudinal axis, said hollow shaft having a first end and a second end, said central hollow shaft adapted to receive a quick-release axle, said central hollow shaft comprising the following three distinct portions:
        a first end piece mounted to the first end of the central hollow shaft, the first end piece extending longitudinally beyond the first end of the hollow shaft;
        a second end piece mounted to the second end of the central hollow shaft, the second end piece extending longitudinally beyond the second end of the hollow shaft;
        a central portion forming a spacer between said first and second end pieces, the central portion being made of a material having a lower density than a material of either of the first and second end pieces;
    a hub body;
    a first bearing and a second bearing, each of said first and second bearings comprising an inner race and an outer race, said inner races of said first and second bearings being mounted on said first and second end pieces of said central hollow shaft, and said outer races of said first and second bearings being mounted to the hub body for rotationally mounting the hub body to the central hollow shaft;

a first shouldered nipple mounted on the first end of the central hollow shaft, and a second shouldered nipple mounted on the second end of the central hollow shaft, said first and second shouldered nipples being adapted to be secured to respective parts of a bicycle fork.

12. A hub assembly according to claim 11, wherein:

said hub body comprises a spacer comprising the following three portions:
- a spacer element consisting of a cylindrical part and a flared end on each of opposed ends of said cylindrical part;
- a first flange attached to a first of said flared ends; and
- a second flange attached to a second of said flared ends;

said spacer element is made of a material having a lower density than a density of either of said first and second flanges.

13. A hub assembly according to claim 12, wherein:
said three portions of said spacer element are made as one-piece.

14. A hub assembly according to claim 12, wherein:
said spacer element is made of a carbon-based composite material or a fiber-based composite material; and said first and second flanges are made of an aluminum alloy.

15. A hub assembly according to claim 1, wherein:
said first and second end pieces of the hollow shaft are made of metal; and
said central portion of the hollow shaft comprises a non-metallic material, said non-metallic material having a density lower than a density of said metal.

16. A hub assembly according to claim 15, wherein:
said first and second end pieces of the hollow shaft are made of an alloy of aluminum, magnesium, or titanium; and
said central portion of the central hollow shaft is made of carbon fibers embedded in a resin matrix.

17. A hub assembly according to claim 1, wherein:
said first shouldered nipple is part of the first end piece and said second shouldered nipple is part of the second end piece.

18. A hub assembly according to claim 1, wherein:
said central portion of the hollow shaft is a cylindrical tube.

19. A hub assembly according to claim 1, wherein:
said central portion of the hollow shaft has a cylindrical outer surface from the first end to the second end of the central portion of the hollow shaft.

* * * * *